United States Patent [19]
Spangemacher

[11] 3,846,519
[45] *Nov. 5, 1974

[54] METHOD OF PREVENTING THE FORMATION OF CLOUDS OF GAS OR SMOKE ON COOLING TOWERS, AND COOLING TOWER FOR CARRYING OUT THE METHOD

[75] Inventor: Kurt Spangemacher, Wasserburg, Inn, Germany

[73] Assignee: Balcke-Durr Aktiengesellschaft, Marienplatz, Bochum, Germany

[ * ] Notice: The portion of the term of this patent subsequent to Jan. 18, 1989, has been disclaimed.

[22] Filed: July 30, 1970

[21] Appl. No.: 59,646

[30] Foreign Application Priority Data
Aug. 1, 1969    Germany............................ 1939174

[52] U.S. Cl................. 261/151, 261/109, 261/159, 261/DIG. 11, 60/96
[51] Int. Cl............................................... B01f 3/04
[58] Field of Search........ 60/95 R, 96; 261/DIG. 11, 261/109, 111, 141, 152–157, 158, 151, 159

[56] References Cited
UNITED STATES PATENTS
| | | | |
|---|---|---|---|
| 3,150,267 | 9/1964 | Caldwell | 60/95 R |
| 3,296,450 | 1/1967 | Johnson | 60/95 R |
| 3,467,364 | 9/1969 | Zathureczky et al. | 261/DIG. 11 |
| 3,608,873 | 9/1971 | Furlong | 261/DIG. 11 |
| 3,635,042 | 1/1972 | Spangemacher | 261/150 |

FOREIGN PATENTS OR APPLICATIONS
| | | | |
|---|---|---|---|
| 525,702 | 9/1940 | Great Britain | 261/DIG. 11 |
| 567,196 | 12/1932 | Germany | 261/DIG. 11 |
| 629,368 | 9/1949 | Great Britain | 261/DIG. 11 |
| 809,906 | 3/1959 | Great Britain | 261/DIG. 11 |

*Primary Examiner*—Tim R. Miles
*Attorney, Agent, or Firm*—Walter Becker

[57] ABSTRACT

Method of and arrangement for preventing the formation of clouds on wet cooling towers, according to which cooling water for cooling the substance to be cooled is passed in one direction over cooling insert means while cooling air is passed in opposite direction in counter current flow thereto and in heat exchange therewith for cooling said water, the thus obtained exhaust air of the cooling tower and prior to leaving the latter being intermixed with a separately heated-up gaseous medium.

8 Claims, 13 Drawing Figures

INVENTOR
KURT SPANGEMACHER

INVENTOR
KURT SPANGEMACHER

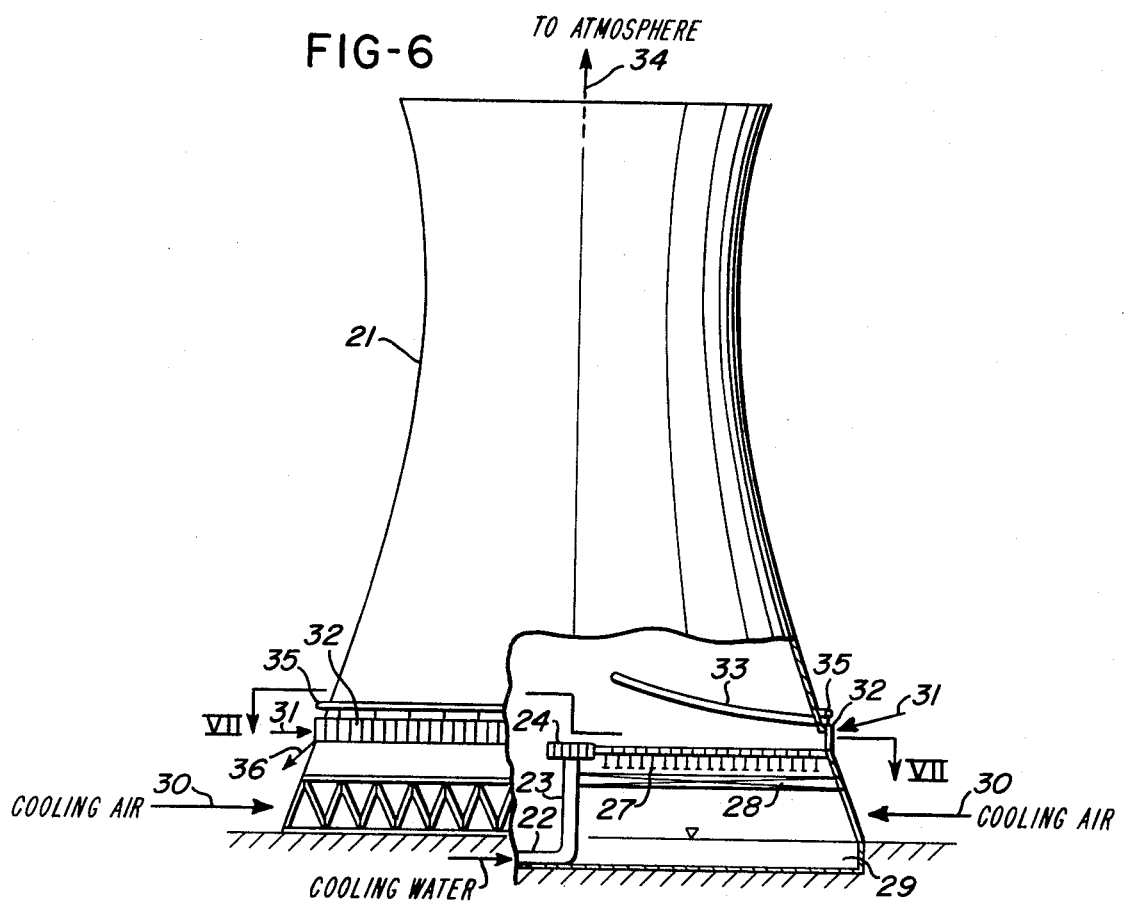
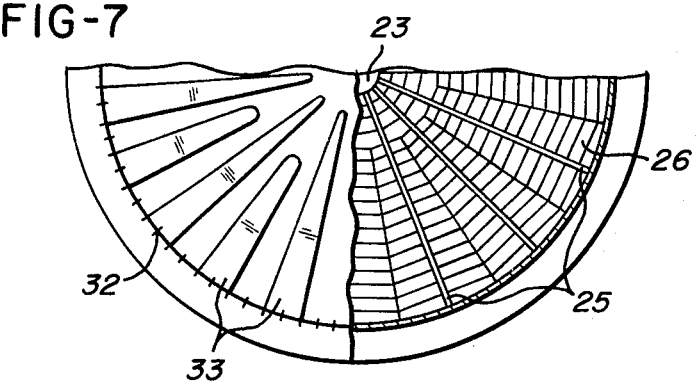
INVENTOR
KURT SPANGEMACHER

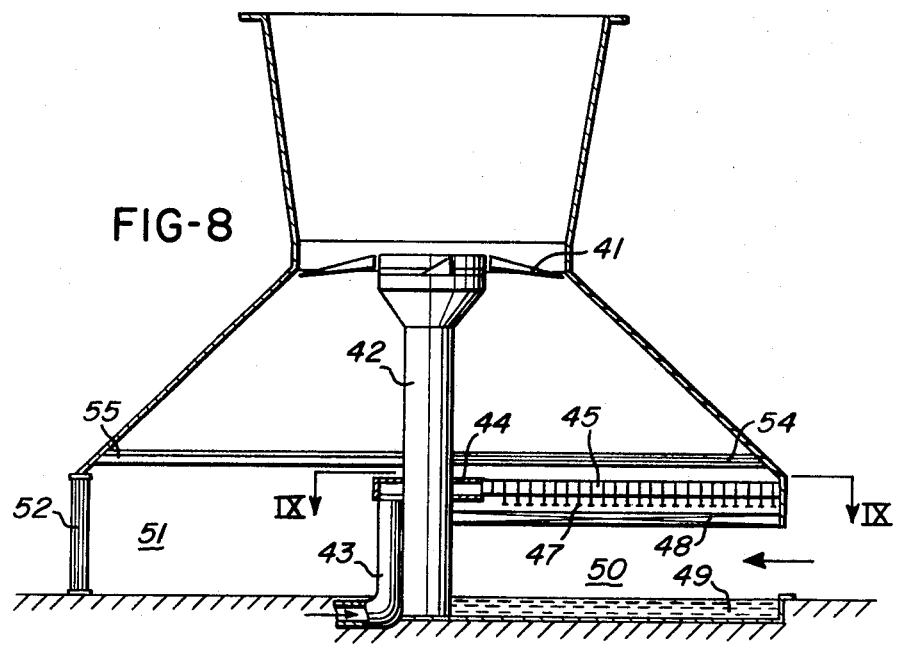
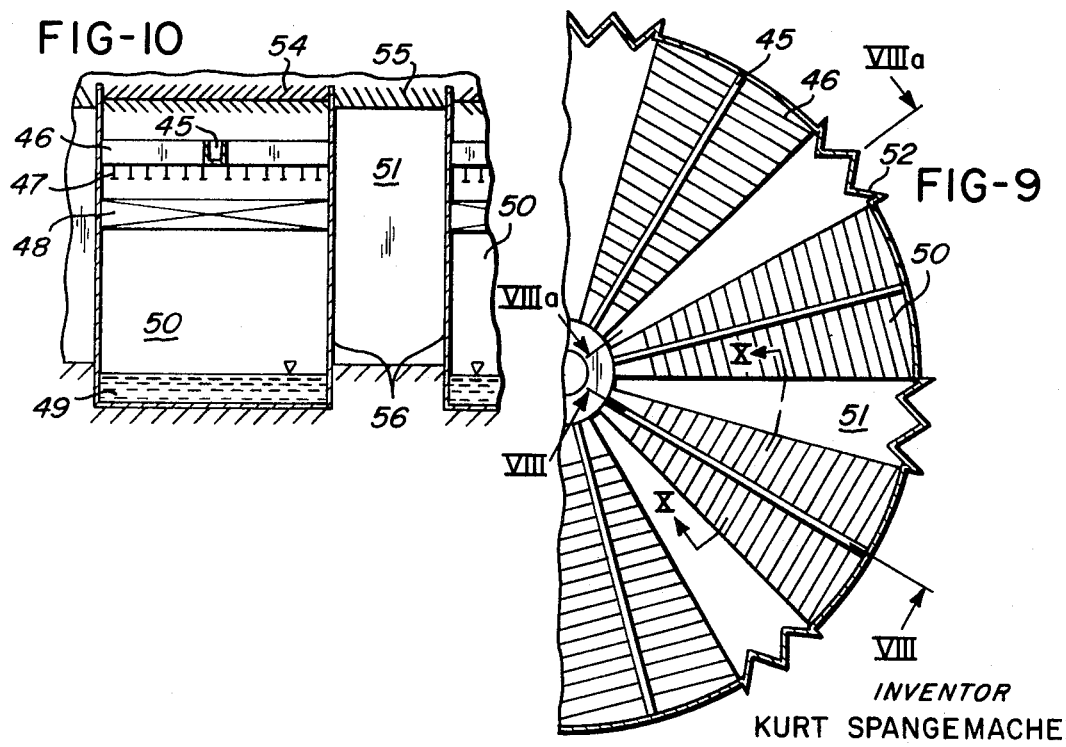

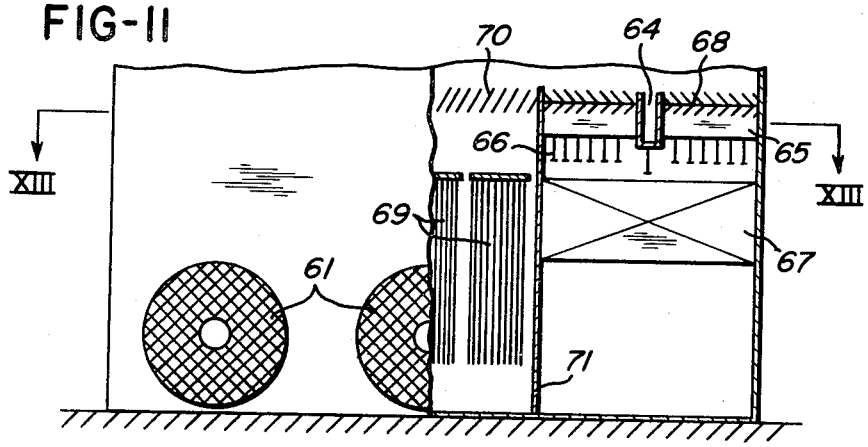
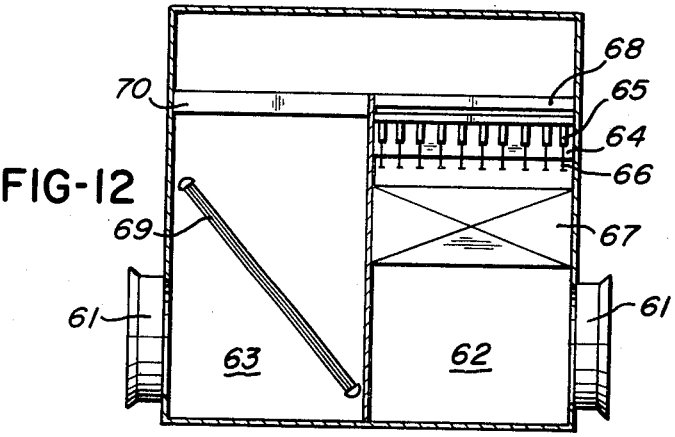
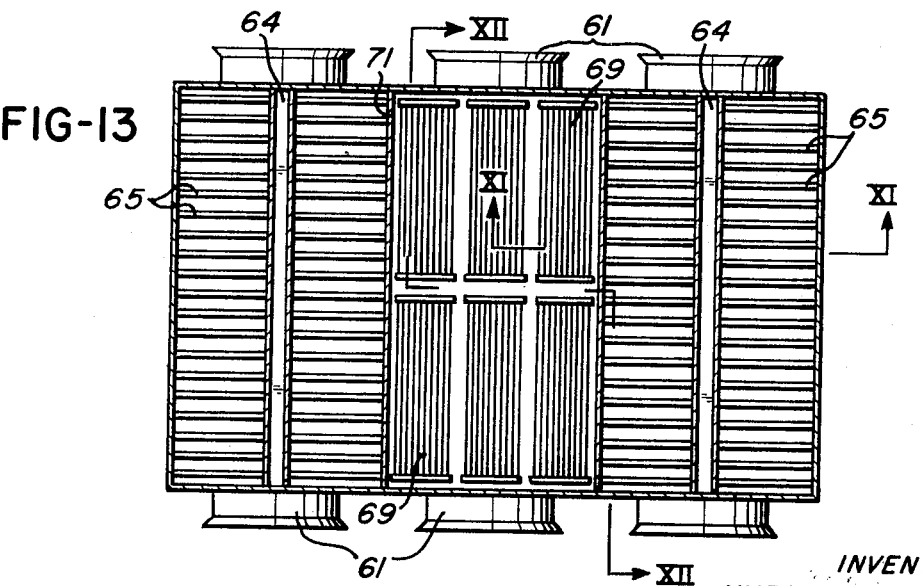

METHOD OF PREVENTING THE FORMATION OF CLOUDS OF GAS OR SMOKE ON COOLING TOWERS, AND COOLING TOWER FOR CARRYING OUT THE METHOD

The present invention relates to a method of preventing the formation of clouds of gas or smoke on cooling towers, and to a cooling tower for carrying out the method. The steam clouds leaving cooling towers, especially in winter, represent a considerable annoyance for street, railway and air traffic. Effective steps for preventing the formation of such clouds have up to date not been available. Therefore, in many instances a cooling in dry heat carriers has been considered even though the costs for such procedure are considerably higher and the evaporization effect is not advantageously utilized.

A method of preventing the formation of fog or mist has become known in connection with steam locomotives operating with condensers, in which the warm flue gases of the locomotive are through nozzle-like mouths conveyed to the water-steam saturated exhaust air of the cooling devices (German Pat. No. 391,012). German Pat. No. 347,141 suggests a similar method for increasing the drawing effect of self-ventilating cooling towers. For the same purpose German Pat. No. 567,196 suggests to heat the exhaust air by means of a gas flame grate.

The above mentioned methods have proved unfeasible for preventing the formation of clouds on cooling towers.

It is, therefore, an object of the present invention to prevent the escape of steam clouds from cooling towers.

This object and other objects and advantages of the invention will appear more clearly from the following specification in connection with the accompanying drawings, in which:

FIG. 1 illustrates the so-called Mollier-ix graph.

FIGS. 2–5 respectively illustrate a plurality of control possiblities for carrying out the method according to the invention.

FIG. 6 represents a self-ventilating cooling tower.

FIG. 7 is a section taken along the line VII—VII of FIG. 1.

FIG. 8 diagrammatically illustrates a round cooling tower with suction blower, the right-hand portion of which represents a section taken along the line VIII—VIII of FIG. 9 while the left-hand portion is a section taken along the line VIIIa—VIIIa of FIG. 9.

FIG. 9 is a section taken along the line IX—IX of FIG. 8.

FIG. 10 represents a section taken along the line X—X of FIG. 9.

FIG. 11 illustrates in view a design with pressure blowers on the left-hand side, and a section taken along the line XI—XI of FIG. 13 on the right-hand side.

FIG. 12 is a section taken along the line XII—XII of FIG. 13.

FIG. 13 is a section of a design with pressure blowers, said section being taken along the line XIII—XIII of FIG. 11.

The present invention is characterized primarily in that the cooling air above the cooling installation is intermixed with dry warm air which has served for cooling products in dry heat carriers, which products originate with the same or another process, while the two media are separated from each other by a fixed wall. The term "dry heat carrier" or "heat transfer means" includes a heat transfer means in which air is employed as cooling medium while, in contrast to a wet cooling tower, in which the evaporation effect is taken advantage of, the air is subjected to no increase in its humidity content.

Figure 1:
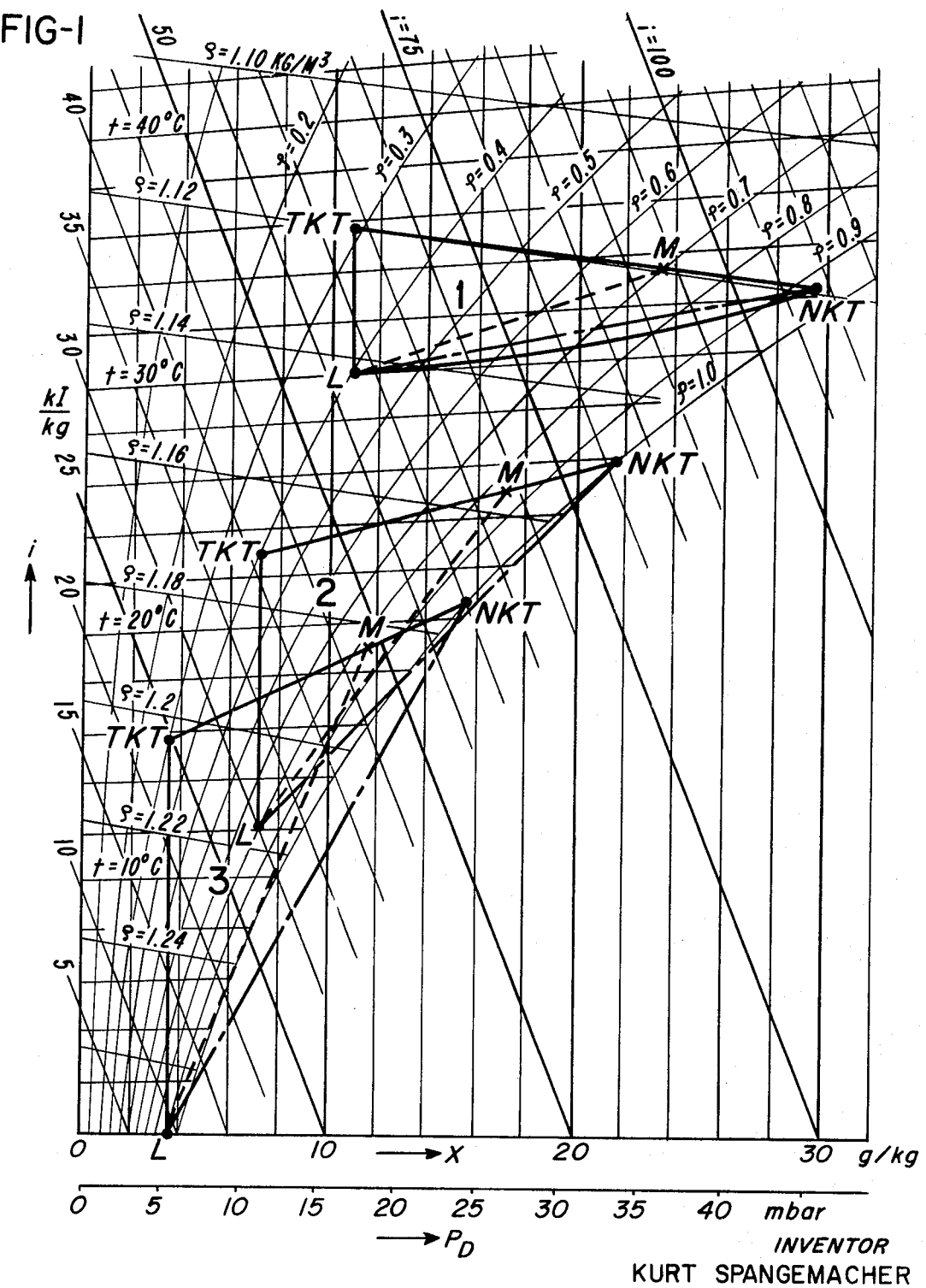

Cooling towers will considerably cloud in winter whereas on hot summer days hardly any steam formation can be observed. The reason for the fact that the steam clouds become visible is seen in that the air leaving the cooling tower will, when intermixing with the outer air, pass the saturation line. When this will occur can well be read from the Mollier-ix graph for moist air. FIG. 1 illustrates a section of such a graph the principle of which is described in the pertinent literature. FIG. 1 shows three instances which differ in the condition of the outer air. Case 1 applies for the summer peaks (30°C, 40 percent relative humidity); case 2 applies for the mean of a year (12°C, 80 percent relative humidity) and case 3 applies for the winter (0°C, 90 percent relative humidity). In each instance, the point L indicates the condition of the outer air, the point NKT represents the condition of the air leaving the wet cooling tower, the point TKT indicates the condition of the only heated air to be admixed, and the point M indicates the condition of mixture which results when dry warm air is admixed, provided that the component of the heat to be conveyed in a dry manner has a mean of the year of approximately 10 percent. The dot-dash line indicated connecting line NKT-L indicates that when effecting the mixture without the step according to the invention, the saturation line will be exceeded during the winter and during the mean of the year. If, however, in conformity with the method of the present invention, dry warm air is admixed, the mixing line M-L will no longer pass through the saturation area so that the cloud formation will no longer be visible.

By increasing the proportion of the dry hot air over the 10 percent referred to in the example, the changes of preventing a cloud formation can still be increased even with extremely low air temperatures and other unfavorable conditions. Theoretically there also exists the possibility of heating and drying the exhaust air from the wet cooling towers by means of warm heating surfaces. Such heating surfaces, however, would, aside from the difficulty of a structural feasibility and an increased pressure loss due to the flow through two serially arranged resistors, be subjected to such a strong corrosion and soiling that this design is practically not feasible.

Various possibilities exist for practically using the method according to the present invention. In conformity with the invention, the cooling water may first be passed through the heat transfer means which serves for producing the dry warm air, and subsequently may be passed through the cooling inserts of the cooling tower. In conformity with the invention it is furthermore provided that a medium to be cooled is conveyed first through the heat transfer means intended for producing the warm air and then is conveyed through a separate heat transfer means where it conveys its heat to the cooling water of a cooling tower which cooling water is passed in a closed circuit through the heat transfer means and the wet cooling tower.

According to a further feature of the invention, a partial flow of the medium to be cooled is conveyed through the heat transfer means which serves for producing the warm air while the other partial flow is conveyed into a separate heat transfer means in which it conveys its heat to the cooling water which latter in a closed circuit is conveyed through the wet cooling tower and the heat transfer means.

For purposes of cooling two media which differ in temperature, it is provided according to the invention that the medium with the higher temperature is cooled in the heat transfer means serving for producing the warm air, whereas the separate heat transfer means is acted upon by the colder medium.

When employing the method according to the present invention in the power plant process, the cooling water of a condenser in which the exhaust steam of a turbine is deposited is re-cooled in the wet cooling tower, whereas the heat carrier which serves for producing the warm air is exposed to the steam withdrawn from the last withdrawing station of the turbine. It is a matter of course that for producing the warm air, also a partial flow of the steam flowing to the condenser may be used instead of the steam withdrawn from the last withdrawing station of the turbine.

The structural design of the cooling tower for carrying out the method according to the present invention is characterized primarily in that in addition to the inlet openings for the cooling air there are also provided air feeding means which serve for producing the warm air and which convey the warm air to the mixing chamber above the cooling inserts. According to one embodiment of the invention it is provided that the air feeding conduits for the hot air are arranged above the entrance openings for the cold air. In this connection it has proved expedient to provide guiding surfaces in the direction of flow of the dry warm air, which guiding surfaces guide a portion of the air up to the interior of the cooling tower.

According to another embodiment of the invention, for purposes of admitting the air, wet and dry passages are arranged alternately adjacent to each other which are separated from each other by walls while the air which passes through the dry passages is heated by the dry heat transfer means and the air in said passages is humidified by means of spraying devices. The invention provides that the walls separating the passages serve as lateral supports for the spraying devices for the wet passages. These passages are in round cooling towers preferably designed as sectors while these passages in a cell cooling tower are arranged parallel to each other. With cooling towers employing pressure blowers, the invention provides that each passage has associated therewith a blower.

According to a further feature of the invention, above the wet passages there are provided water catching devices of a known type which are so designed that at the same time they will impart a twist upon the air while above the dry passages guiding surfaces are provided in order to impart upon the air a twist which is oppositely directed to the twist imparted upon the wet air.

Referring now to the drawings in detail, the arrangement shown therein comprises a wet cooling tower 1 and a dry heat transfer means 2 for heating the air which for preventing the formation of clouds is intermixed with the exhaust air of the cooling tower. The cooling air which is withdrawn from the atmosphere, passes in the direction of the arrow 3 into the wet cooling tower 1 and, in conformity with the arrow 4, atmospheric air passes into the dry heat transfer means 2 and is withdran in the direction of the arrow 5 after having been admixed to the air discharged from the cooling tower.

Figure 2:
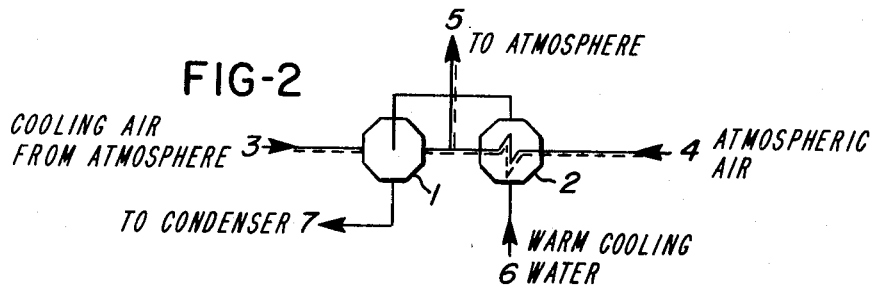

According to the arrangement of FIG. 2, warm cooling water flows in the direction of the arrow 6 successively through the dry heat transfer means 2 and the wet cooling tower 1 in the direction of the arrow 7 to the condenser.

Figure 3:
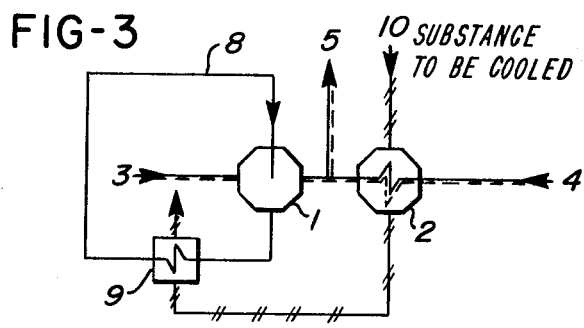

According to the arrangement of FIG. 3, in which a gaseous or liquid product may be cooled and a vaporous product may be condensed, the product is in the direction of the arrow 10 passed through the dry heat transfer means 2 and from there is conveyed into a separate heat conveying means 9 which is arranged in a closed cooling circuit 8. The cooling water circulating in this cooling circuit will in the heat transfer means 9 absorb heat from the product to be cooled which previously was cooled in the dry cooling tower or heat transfer means 2. The cooling of the cooling water is then effected in the wet cooling tower 1.

Figure 4:
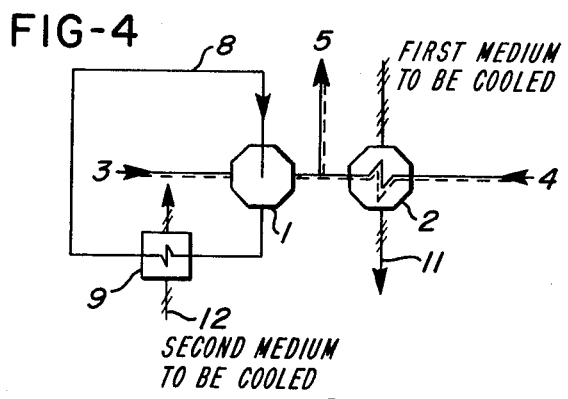

The arrangement of FIG. 4 differs from that of FIG. 3 in that two different products 11 and 12 are being cooled while the product 11 is passed through the dry heat transfer means 2 whereas the other product passes through the heat transfer means 9.

It has been found expedient to convey the warmer product to the dry heat transfer means where it is cooled by air, and to cool the colder product in the heat transfer means 9 by the cooling water.

Figure 5:
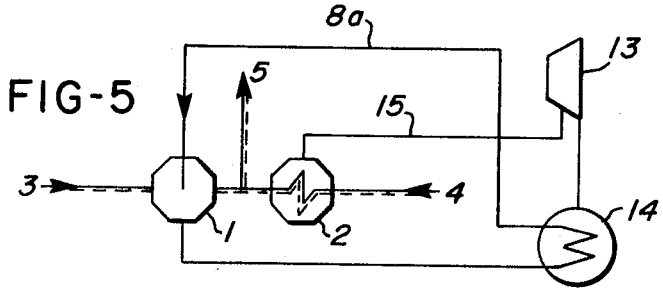

FIG. 5 shows the application of the invention for the power plant process according to which the cooling water for a condenser 14 which is employed for condensing the exhaust steam of a turbine 13 is cooled by means of a cooling circuit 8a which principally corresponds to that of FIG. 3. A portion of the steam derived from the last turbine discharge and passed through conduit 15 is condensed in the dry heat transfer means 2 and serves for heating the air which is introduced into the wet cooling tower 1. It is, of course, to be understood that also a portion of the steam flowing to the condenser 14 may be employed instead of the steam derived from the turbine exhaust.

FIGS. 6 to 13 illustrate different designs for cooling towers which are suitable for practicing the method according to the present invention. FIGS. 6 and 7 illustrate a self-ventilating cooling tower in which the cup 21 serves for producing the buoyancy or draft for the cooling air. The cooling water passes through a conduit 22 and passage 23 to a distributor 24 by which it is uniformly divided and conveyed into the main channels 25. From here the cooling water passes into the auxiliary channels 26 the bottom of which is provided with calibrated spray pipes 27 with spray dishes. The cooling of the water which is collected in the basin 29 is effected by contact with the air which from below flows upwardly into the inserts 28. The main flow of the cooling air is drawn-in from the outside in the direction of the arrows 30. The auxiliary flow passes in the direction of the arrows 31 through the dry heat transfer means 32 whereby it will be heated and will intermix with the humid air. For purposes of improving the intermixing process, there are provided guiding blades 33 which are bent in the manner of a tongue and extend into the wet air flow. The purpose of the guiding blades 33 consists in imparting a twist upon the warm air and simultaneously guiding a portion of the air into the center of the cooling tower. The mixture of humid or moist and dry air flows into the atmosphere in the direction of the arrow 34. The medium to be cooled in a dry manner or to be condensed passes through the conduit 35 into the dry heat transfer means 32 and leaves the latter through a conduit 36. If the medium to be cooled in the dry heat transfer means 32 is identical to the medium to be cooled in the wet cooling tower, for instance, if in both instances cooling water is involved, the conduits 22, the passage 23, and the distributor 24 may be omitted. In such an instance the water will not flow off through conduit 36 but will pass from the dry heat transfer means 32 directly into the channels 25.

According to the embodiment of FIGS. 8 to 10, the draft for the cooling air is produced by a blower 41 which is mounted on a column 42 in which there is also located the transmission for the drive. The cooling water flows through conduit 43 to the distributor 44 by means of which it is divided and uniformly passes into the main channels 45. From here the cooling water passes into the auxiliary channels 46 the bottom of which is provided with calibrated spray pipes 47 with spray dishes. The water is, similar to the above described embodiment, cooled by contact with air in the inserts 48 and is collected in the basin 49. The air is drawn-in through alternately and adjacently arranged wet and dry passages which are separated from each other by walls. The main flow of the cooling air passes from the outside through the wet passages 50 into the cooling tower. The auxiliary flow passes prior to entering the dry passages 51 through dry heat transfer means 52 and intermixes with the humid or moist air from the passage 50. The air mixture flows through blower 41 into the atmosphere. The dry cooling or condensation is effected in the dry heat transfer means 52. Above the wet passage 50 there are provided drip separators 55 known per se, which simultaneously impart a twist upon the air. Corresponding guiding surfaces 55 with opposite inclination are arranged above the dry passages 51. The dry and the wet passages are separated from each other by continuous walls 56 which serve simultaneously for connecting the spraying devices.

FIGS. 11 to 13 illustrate a cooling tower with pressure blowers 61. These blowers convey the air into the wet passages 62 and the dry passages 63. The cooling water is introduced into the main channels 64 and from there is distributed into the auxiliary channels 65, and from the bottom of said channels 65 flows out of calibrated spray pipes 66 with spray dishes in order to cool in the cooling inserts 67 by contact with the air. Above the channels 64 and 65 there are located the drip separators 68 which simultaneously impart a change in the direction upon the air. The air passing through the dry passages 63 is drawn through the dry heat transfer means 69 and the guiding surface 70 which correspond to the drip separators 68 but have an opposite inclination. The dry and the wet channels are separated from each other as is the case with the preceding embodiment.

If desired, it would also be possible to arrange the dry part of the cooling tower on one side and the wet part of the cooling tower on the other side in which instance the blowers of the wet part would be located adjacent to each other and the blowers of the dry part with opposite blowing direction would be located likewise adjacent to each other on the opposite side.

The depth of the passages or channels and the size of the blowers will be selected with respect to each other in conformity with the desired degree of wet drying so that the separating wall or partition between the dry and wet part may not coincide with the center line. Also with this embodiment, the inclination of the drip separator is opposite to the inclination of the guiding surfaces of the dry part.

It is, of course, to be understood that the present invention is, by no means, limited to the particular constructions shown in the drawings but also comprises any modifications within the scope of the appended claims.

What I claim is:

1. A wet cooling tower system for preventing the formation of clouds thereon, which includes; a wet cooling tower with cooling insert means and with inlet means for admitting cooling water, air inlet means associated with said cooling tower for admitting cooling air thereto, said cooling tower also being provided with exhaust means for discharging exhaust air from said cooling tower, indirect heat transfer means having inlet means for a surrounding gaseous medium and also having internal means for heating up said gaseous medium admitted thereto, and conduit means establishing communication between said heat transfer means and said exhaust means for admixing said heated-up gaseous medium from said heat transfer means with the exhaust air discharged from said wet tower into said exhaust means.

2. A wet cooling tower system according to claim 1, in which said heat transfer means is provided with inlet means for admitting the substance to be cooled and is also provided with outlet means for discharging from said heat transfer means the substance to be cooled, and which includes additional heat transfer means communicating with said outlet means for receiving therefrom the substance cooled in said first mentioned heat transfer means, closed circuit means being provided which have interposed therein said additional heat transfer means and said cooling tower.

3. A wet cooling tower system according to claim 1, in which the cooling tower includes: wet passages and dry passages in alternate arrangement adjacent to each other for conveying air therethrough, wall means separating said wet passages and dry passages from each other, said heat transfer means being operable to heat up the air to be passed through said dry passages, and spray means for humidifying the air in said wet passages.

4. A wet cooling tower system according to claim 3, in which said wall means form supporting means for said spray means.

5. A wet cooling tower system according to claim 1, in which the conduit means for the heated-up gaseous medium leads into the cooling tower over the location at which cooling air enters said cooling tower.

6. A wet cooling tower system according to claim 5, which includes guiding means associated with said cooling tower for directing a portion of the heated-up gaseous medium to the interior of said cooling tower.

7. A wet cooling tower system for preventing the formation of clouds thereon, which includes: a wet cooling tower with cooling insert means and with inlet means for admitting cooling water, air inlet means associated with said cooling tower for admitting cooling air thereto, said cooling tower also being provided with exhaust means for discharging exhaust air from said cooling tower, indirect heat transfer means having inlet means for a surrounding gaseous medium and also having internal means for heating up said gaseous medium admitted thereto, and conduit means establishing communication between said heat transfer means and said exhaust means for admixing said heated-up gaseous medium from said heat transfer means with the exhaust air discharged from said wet tower into said exhaust means, said cooling tower including: wet passages and dry passages in alternate arrangement adjacent to each other for conveying air therethrough, wall means separating said wet passages and dry passages from each other, said heat transfer means being operable to heat up the air to be passed through said dry passages, and spray means for humidifying the air in said wet passages and a plurality of blower means respectively associated with said dry and wet passage means.

8. A wet cooling tower system for preventing the formation of clouds thereon, which includes: a wet cooling tower with cooling insert means and with inlet means for admitting cooling water, air inlet means associated with said cooling tower for admitting cooling air thereto, said cooling tower also being provided with exhaust means for discharging exhaust air from said cooling tower, indirect heat transfer means having inlet means for a surrounding gaseous medium and also having internal means for heating up said gaseous medium admitted thereto, and conduit means establishing communication between said heat transfer means and said exhaust means for admixing said heated-up gaseous medium from said heat transfer means with the exhaust air discharged from said wet tower into said exhaust means, said cooling tower including: wet passages and dry passages in alternate arrangement adjacent to each other for conveying air therethrough, wall means separating said wet passages and dry passages from each other, said heat transfer means being operable to heat up the air to be passed through said dry passages, and spray means for humidifying the air in said wet passages, water collecting means arranged above said wet passage means and adapted to impart a twist upon the air passing through said wet passage means, and guiding means arranged above said dry passage means and adapted to impart upon the air passing through said dry passage means a twist directed opposite to said first mentioned twist.

* * * * *